W. H. WALTER.
SAFETY PRESSURE DEVICE.
APPLICATION FILED FEB. 20, 1914.
1,127,128.
Patented Feb. 2, 1915.
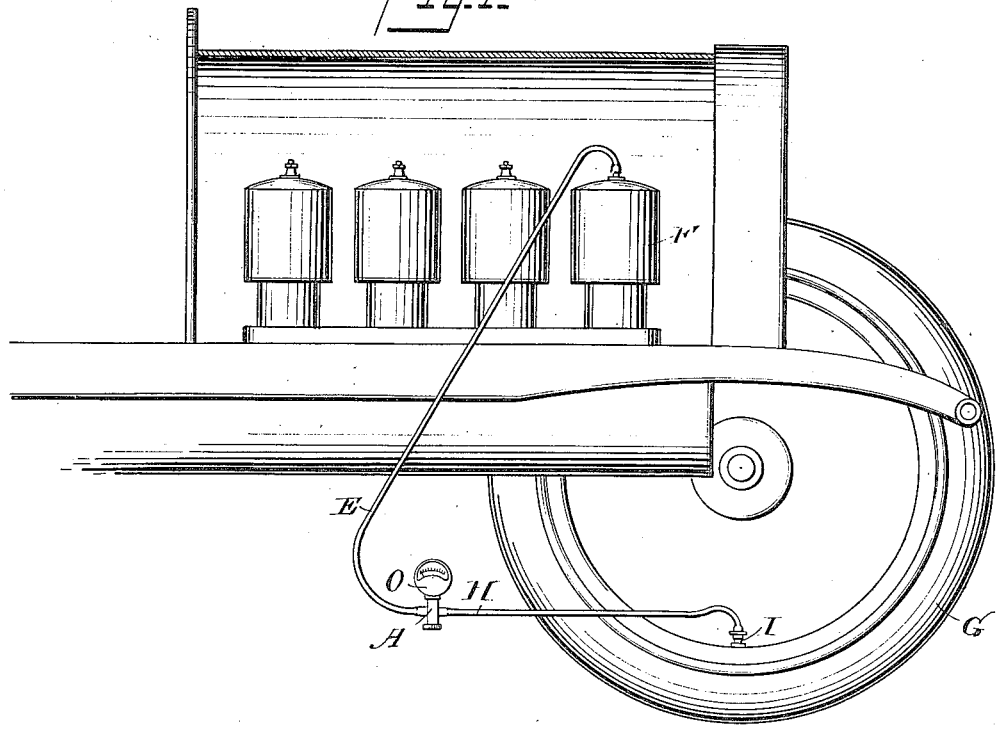
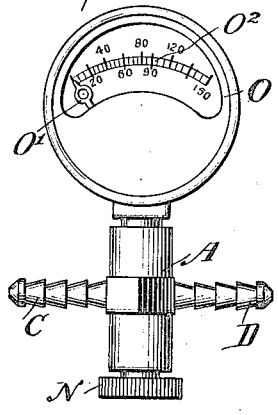
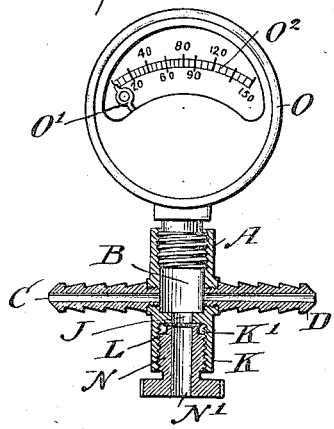
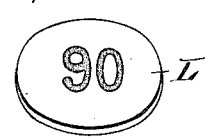
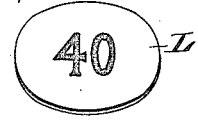
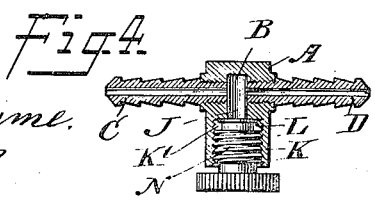
WITNESSES
INVENTOR
William H. Walter
BY
ATTORNEYS

UNITED STATES PATENT OFFICE.

WILLIAM H. WALTER, OF NEW YORK, N. Y.

SAFETY PRESSURE DEVICE.

1,127,128.  Specification of Letters Patent.  Patented Feb. 2, 1915.

Application filed February 20, 1914. Serial No. 819,972.

*To all whom it may concern:*

Be it known that I, WILLIAM H. WALTER, a citizen of the United States, and a resident of the city of New York, borough of Manhattan, in the county and State of New York, have invented a new and Improved Safety Pressure Device, of which the following is a full, clear, and exact description.

The object of the invention is to provide a new and improved safety pressure device, more especially designed for use in the flexible connection connecting a pump with a pneumatic tire for inflating the latter and arranged to prevent inflation of the tire beyond a predetermined pressure thus preventing bursting of the tire while inflating the same. In order to accomplish the desired result use is made of a safety device having a safety discharge opening leading to the atmosphere, and a frangible diaphragm normally closing the said discharge opening and tested to withstand a desired pressure.

A practical embodiment of the invention is represented in the accompanying drawings forming a part of this specification, in which similar characters of reference indicate corresponding parts in all the views.

Figure 1 is a side elevation of the improved safety pressure device as applied to the hose connection between a pump and one of the tires of a power-driven vehicle; Fig. 2 is an enlarged side elevation of the safety pressure device; Fig. 3 is a sectional side elevation of the same; Fig. 4 is a similar view of a modified form of the same; and Figs. 5 and 6 are perspective views of diaphragms for different maximum pressures.

The body A of the safety pressure device is provided with a chamber B connected with nipples C and D preferably extending from opposite sides of the body A and screwed or otherwise detachably secured thereto. The nipple C is connected by a flexible tube E with a pump of any approved construction. As shown in Fig. 1, the pump is in the form of one of the cylinders F of a four-cylinder internal combustion engine, the said cylinder F being used at the time as a pump for pumping air with a view to inflate the tire G. The nipple D is connected by a hose H with the usual valve I on the tire G so that when the pump is working air is forced by way of the tube E, nipples C, D, chamber B, tube H and valve I into the tire G to inflate the same.

In order to prevent the tire G from being inflated with more than a predetermined pressure use is made of the following arrangement: The chamber B is provided with a discharge opening J leading into a recess K' of a boss K forming part of the body A. The recess K' is somewhat larger in diameter than the discharge opening J so as to form in the bottom of the recess a shoulder or a seat for a diaphragm L, made of paper or other suitable fabric material tested to withstand a desired pressure. Thus for different pressures diaphragms are used to withstand such pressures, and the diaphragms are provided with numerals indicating the maximum pressure to which they have been tested; thus, as shown for instance in Fig. 5, the diaphragm L is tested to withstand a pressure of ninety pounds before bursting, while the diaphragm L shown in Fig. 6 is tested to withstand a pressure of forty pounds before bursting. The diaphragm L is held to its seat by a plug N screwing in the correspondingly-threaded recess K' of the boss K, and the plug N is provided with a central opening N' in register with the discharge opening J.

It will be noticed that in case the tire G is inflated to a pressure corresponding to or exceeding that of the diaphragm L then the latter bursts and allows the air to escape from the chamber B by way of the openings J and N' thus preventing further inflation and bursting of the tire G. It will also be noticed that the plug N can be readily screwed in place in the boss K to securely hold the diaphragm L in place with a view to close the discharge opening as long as the pressure is less than the pressure the diaphragm is capable of withstanding, as previously explained.

As shown in Figs. 1, 2 and 3, a pressure gage O is mounted on the body A and is in communication with the chamber B so that the pointer O' of this pressure gage indicates the pressure in the chamber B on the usual graduation $O^2$. The pressure gage O, however, may be omitted, as indicated in Fig. 4.

It will be noticed that when the plug N is removed a diaphragm L can be readily placed in position and then secured to its seat on replacing the plug N. It will also be noted that the nipples C and D are removable and interchangeable, so that if one should become broken or injured it can be readily replaced in which event it would not be necessary to provide a new central pressure receiving chamber.

Having thus described my invention, I claim as new and desire to secure by Letters Patent:

1. A safety pressure device for inflating pneumatic tires comprising a central pressure chamber, inlet and outlet nipples detachably and interchangeably secured thereto, and extending in opposite directions therefrom and adapted to be inserted in a hose section, a discharge opening leading from said pressure chamber, and leading to the atmosphere, and a frangible diaphragm normally closing the discharge opening and tested to withstand a predetermined pressure said diaphragm bearing thereon, a legend indicating the limit of such pressure.

2. A safety pressure device comprising a central body member, detachable and interchangeable inlet and outlet nipples extending from said body member, a chamber in the said body member and into which leads the inlet nipple and from which leads the outlet nipple, the said chamber having a reduced outlet opening, an apertured boss on the said body member having a threaded recess into which leads the reduced outlet opening, the said recess forming with the said outlet opening a shoulder, a frangible diaphragm seated on said shoulder and tested to withstand a predetermined pressure, the diaphragm bearing a legend indicating the limit of such pressure, and a screw plug screwed in the said body and having a central opening leading to the atmosphere and in register with the said reduced outlet opening.

In testimony whereof I have signed my name to this specification in the presence of two subscribing witnesses.

WILLIAM H. WALTER.

Witnesses:
 THEO. G. HOSTER,
 PHILIP D. ROLLHAUS.